United States Patent [19]

Hirai et al.

[11] Patent Number: 4,675,309

[45] Date of Patent: Jun. 23, 1987

[54] ADSORBENT FOR USE IN SELECTIVE GAS ADSORPTION-SEPARATION AND A PROCESS FOR PRODUCING THE SAME

[75] Inventors: Hidefumi Hirai, 14-10, Yutenji 1-chome, Meguro-ku, Tokyo; Makoto Komiyama, Tokyo; Kazunori Kurima, Tokyo; Keiichiro Wada, Tokyo, all of Japan

[73] Assignee: Hidefumi Hirai, Tokyo, Japan

[21] Appl. No.: 854,444

[22] Filed: Apr. 21, 1986

[30] Foreign Application Priority Data

Apr. 22, 1985 [JP] Japan .................................. 60-85636
Apr. 23, 1985 [JP] Japan .................................. 60-86890

[51] Int. Cl.$^4$ ...................... B01J 20/26; B01D 53/02; C07C 7/12
[52] U.S. Cl. ........................................ 502/402; 55/74; 585/829
[58] Field of Search ............................... 502/401, 402

[56] References Cited

U.S. PATENT DOCUMENTS 4,019,879  4/1977  Rabo et al. .
4,546,094  10/1985  Hirai et al. ......................... 502/402

OTHER PUBLICATIONS

Journal of Catalysis, vol. 61, 461 (1980).
Journal of Catalysis, vol. 30, 187 (1973).
Industrial and Engineering Chemistry, vol. 42, 1319 (1950).

Primary Examiner—W. J. Shine
Attorney, Agent, or Firm—Armstrong, Nikaido, Marmelstein & Kubovcik

[57] ABSTRACT

There is disclosed an adsorbent comprising a macroreticular polystyrene type resin having amino groups selected from the group consisting of primary, secondary and tertiary amino groups and combinations thereof, and a copper(I) halide fixed to the macroreticular polystyrene type resin. Such an adsorbent has been found to be advantageously employed for the selective adsorption-separation of a gas from a gaseous mixture.

8 Claims, No Drawings

ADSORBENT FOR USE IN SELECTIVE GAS ADSORPTION-SEPARATION AND A PROCESS FOR PRODUCING THE SAME

This invention relates to an adsorbent. More particularly, the present invention is concerned with an adsorbent for use in the selective adsorptionseparation of a gas from a gaseous mixture, and a process for producing the adsorbent.

Separation of a gas from a gaseous mixture is important in various fields. The separation of a component gas from the gaseous mixture is generally conducted for the selective recovery or removal of a gas from a gaseous mixture.

With respect to the recovery or removal of a component gas from the gaseous mixture, there have conventionally been employed the so-called cryogenic processing method in which a gaseous mixture is liquefied by cooling and the resulting liquid mixture is then subjected to distillation at a low temperature to obtain each component gas separately. However, the cryogenic processing method is unsatisfactory because it has the following various drawbacks.

(1) Complicated cooling and heat recovering systems should be used.

(2) The construction cost of an apparatus for practicing the cryogenic processing method is high because expensive materials such as aluminum, copper, nickel and stainless steel should be used for the construction of the apparatus.

(3) A large amount of electric power is required for operating the apparatus.

(4) It is difficult to separate gases whose boiling points are close.

(5) The gaseous mixture to be separated should be essentially free of water vapor and carbon dioxide since these compounds form solids and cause plugging of the various parts of the apparatus. Therefore, water and carbon dioxide should be removed from the gaseous mixture prior to the separation.

Another conventional method which has been employed for the recovery or removal of a component gas from the gaseous mixture is the so-called absorption method in which a certain gas contained in a gaseous mixture is absorbed in an absorbing solution containing a cuprous salt and the absorbed gas is then released from the absorbing solution by heating the adsorbing solution under reduced pressure (see, for example, "Encyclopedia of Chemical Technology", R. E. Kirk and D. F. Othmer, Interscience Encyclopedia Inc., New York, 1950, P.894). The above-mentioned absorption method is also unsatisfactory because of difficulty in operation of the apparatus for practicing the method, high cost of construction for the apparatus, instability of the absorbing solution, or the like.

Meanwhile, there is known a method of selectively separating a desired gas from a gaseous mixture using a solid adsorbent. This method is hereinafter often referred to as "adsorption method." The adsorption method consists in passing a gaseous mixture through a solid adsorbent mass, so that a component gas is adsorbed and the component gas-depleted effluent gas stream is obtained. In this method, the adsorbed gas is desorbed from the solid adsorbent by subjecting the solid adsorbent to heat treatment or vacuum treatment. The adsorption method can eliminate the drawbacks accompanying the above-mentioned cryogenic processing method and absorption method. For practicing the adsorption method, there have been proposed various solid adsorbents. For example, Journal of Catalysis, Vol. 61, 461(1980) discloses that a modified zeolite comprising a zeolite and copper(I) or silver(I) fixed to the zeolite adsorbs ethylene. Further, Journal of Catalysis, Vol. 30, 187 (1973) and U.S. Patent Specification No. 4,019,879 disclose that the above-mentioned modified zeolite comprising a zeolite and a copper(I) fixed to the zeolite adsorbs carbon monoxide as well as ethylene. However, the modified zeolite as mentioned above has an extremely high affinity for carbon monoxide and ethylene. Therefore, to desorb the adsorbed carbon moxide and ethylene, it is disadvantageously necessary to treat the adsorbent having the gases adsorbed thereon at a high temperature or under a highly reduced pressure.

Industrial and Engineering Chemistry, Vol. 42, 1319 (1950) discloses that an activated carbon absorbs an unsaturated hydrocarbon. However, the activated carbon adsorbs, beside unsaturated hydrocarbon, nitrogen, carbon dioxide, methane and ethane too. Therefore, the selective adsorption and separation of an unsaturated hydrocarbon contained in a gaseous mixture comprising an unsaturated hydrocarbon and at least one other component gas selected from nitrogen, carbon dioxide, methane and ethane cannot be performed using the activated hydrocarbon.

As is apparent from the foregoing, the adsorption method has an advantage over the cryogenic method and absorption method but is still unsatisfactory since the conventional adsorbents used in the adsorption method are poor in selectivity with respect to a gas adsorption or has a problem with respect to the desorption of the adsorbed gas.

In view of the current situation as described above, the present inventors have made extensive and intensive studies to develop a solid adsorbent for the adsorption method which is excellent not only in selectivity with respect to gas adsorption but also in desorption of the adsorbed gas. As a result, it has surprisingly been found that a solid adsorbent comprising a macroreticular polystyrene type resin having amino groups selected from the group consisting of primary, secondary and tertiary amino groups and combinations thereof, and a copper(I) halide fixed to the macroreticular polystyrene type resin is capable of adsorbing, with high selectivity, a gas, e.g. carbon monoxide, unsaturated hydrocarbons or acetylene, and that the adsorbed gas can be easily desorbed therefrom under mild conditions. The present invention has been made based on such novel findings.

Accordingly, it is a primary object of the present invention to provide a solid adsorbent for use in the selective adsorption-separation of a gas from a gaseous mixture which is excellent not only in selectivity with respect to gas adsorption but also in desorption of the adsorbed gas.

The foregoing and other objects, features and advantages of the present invention will be apparent [I]to those skilled in the art from the following detailed description and appended claims.

According to the present invention, there is provided an adsorbent for use in the selective adsorption-separation of a gas from a gaseous mixture, which comprises a macroreticular polystyrene type resin having amino groups selected from the group consisting of primary, secondary and tertiary amino groups and combinations thereof, and a copper(I) halide fixed to said macroreticular polystyrene type resin.

The adsorbent of the present invention is used for the selective adsorption-separation of a gas from a gaseous mixture. As examples of the selective adsorption-separation of a gas from a gaseous mixture in which the adsorbent of the present invention can be advantageously used, there may be mentioned the recovery or removal of an unsaturated hydrocarbon, carbon monoxide and/or acetylene from gaseous mixtures. As representative examples of the recovery or removal of an unsaturated hydrocarbon from a gaseous mixture, there may be mentioned the recovery of an unsaturated hydrocarbon from a gaseous mixture of the unsaturated hydrocarbon and at least one other component gas such as nitrogen, methane, ethane, carbon dioxide, hydrogen and water vapor, e.g. the recovery of an unsaturated hydrocarbon contained in a gaseous mixture obtained by subjecting to thermal decomposition treatment a natural gas, refinery gas, petroleum fraction or the like; and the recovery of an unsaturated hydrocarbon contained in a purge gas and off-gas discharged from, for example, a coke oven and converter of an iron mill, fluid catalytic cracking plant of a petroleum refinery factory, ethylene oxide and propylene oxide synthesizing plants, and petrochemical plants. As examples of the unsaturated polyolefin which can be selectively adsorbed on the adsorbent of the present invention, there may be mentioned, e.g. monoolefins having 2 to 8 carbon atoms, polyolefins and dienes.

As representative examples of the recovery or removal of carbon monoxide from a gaseous mixture, there may be mentioned the recovery of carbon monoxide from a gaseous mixture of carbon monoxide and at least one other component gas such as hydrogen, carbon dioxide, methane, nitrogen and water vapor, e.g. the recovery of carbon monoxide contained in a gaseous mixture produced from coke and coal using a gas producer, water gas generator, Winkler gasifier, Lurgi gasifier, or Kopper's gasifier; the recovery of carbon monoxide contained in a gaseous mixture obtained by steam reforming or partial oxidation of a natural gas or petroleum hydrocarbon; the recovery of carbon monoxide produced as a by-product in iron mills, oil refineries, petrochemical plants and the like; and the removal of carbon monoxide contained in a small amount in hydrogen gas separated from an offgas discharged from a plant for dehydrogenating a hydrocarbon in petrochemical factories.

As representative examples of the removal or recovery of acetylene from a gaseous mixture, there may be mentioned the recovery or removal of acetylene from a gaseous mixture of acetylene and at least one other component gas such as methane, ethane, nitrogen and water vapor.

The adsorbent of the present invention comprises a macroreticular polystyrene type resin having amino groups selected from the group consisting of primary, secondary and tertiary amino groups and combinations thereof, and a copper(I) halide fixed to said macroreticular polystyrene type resin. In the present invention, it is preferred that the macroreticular polystyrene type resin comprise a crosslinked copolymer of substituted or unsubstituted styrene monomer units and divinyl aromatic compound monomer units, and have the amino groups bonded to the crosslinked copolymer.

The crosslinked copolymer preferably contains the divinyl aromatic compound monomer units in an amount of 5 to 70 mol %, more preferably 5 to 30 mol % based on the total amount of the substituted or unsubstituted styrene monomer units and divinyl aromatic compound monomer units.

As examples of the substituted or unsubstituted styrene monomer units, there may be mentioned monomer units of styrene, α-methylstyrene, p-methylstyrene and p-tert-butylstyrene.

As examples of the divinyl aromatic compound monomer units, there may be mentioned monomer units of divinylbenzenes, divinyltoluenes and divinylethylbenzenes, and the like.

The amino groups bonded to the crosslinked copolymer may be selected from the group consisting of primary, secondary and tertiary amino groups, i.e. unsubstituted, monosubstituted and disubstituted amino groups and combinations thereof. That is, they may generally be represented by the following general formula:

wherein R and R' each independently stand for a hydrogen atom, and a straight or branched hydrocarbon radical having 1 to 6 carbon atoms.

In the present invention, the amino groups may be directly bonded to the backbone of the crosslinked copolymer or may be bonded to the side chain of the crosslinked copolymer.

It is preferred that the content of the amino groups in the macroreticular polystyrene type resin be 0.5 to 15 meq./g, more preferably 2.5 to 10 meq/g of the dried resin. The content of the amino groups may be determined by the customary method, e.g. a method described in K. Dorfner, "Ion Exchangers Properties and Applications", pages 40–44, Ann. Artor Science Publishers, Inc., Michigan, USA., 1972, and "DIAION, Ionkokan Jyushi.Gosei Kyuchakuzai Manyuaru [I]"('-'Manual [I]on DIAION, Ion Exchange Resin.Synthetic Adsorbent"), pages 95–100, published by Mitsubishi Chemical Industries, Ltd., Japan.

In the adsorbent of the present invention, a copper(I) halide is fixed to the macroreticular polystyrene type resin. As examples of the copper(I) halide, there may be mentioned copper(I) chloride, copper(I) bromide and copper(I) iodide. It is preferred that the copper(I) halide be fixed to the macroreticular polystyrene type resin in an amount of at least 1.0 milliequivalent, more preferably at least 1.5 milliequivalents per milliequivalent of the amino groups contained in the macroreticular polystyrene type resin. When the amount of the copper(I) halide is at least 1.0 milliequivalent per milliequivalent of the amino groups contained in the macroreticular polystyrene resin, the adsorbent is extremely excellent in selectivity with respect to gas adsorption. The weight ratio of the copper(I) halide fixed to the macroreticular polystyrene type resin relative to the macroreticular polystyrene type resin is preferably 0.05 or more, more preferably 0.25 or more.

Incidentally, in the adsorbent of the present invention, when the amount of the copper(I) halide fixed to the macroreticular polystyrene type resin is 1 milliequivalent or less per milliequivalent of the amino groups contained in the macroreticular polystyrene type resin, the copper(I) halide is fixed to the macroreticular polystyrene type resin in the form of complexes with the amino groups contained in the macroreticular polystyrene type resin. On the other hand, when the amount of the copper(I) halide fixed to the macroreticular polystyrene type resin exceeds 1 milliequivalent per milliequivalent of the amino groups contained in the macroreticular polystyrene type resin, the copper(I) halide in an amount equivalent to the amount of the amino groups contained in the macroreticular polystyrene type resin is fixed to the macroreticular polystyrene type resin in the form of complexes with the amino groups contained in the macroreticular polystyrene type resin, and the remaining copper(I) halide is indirectly fixed to the macroreticular polystyrene type resin by forming a bridge bond with the halogen atoms of the copper(I) halide forming the complexes with the amino groups contained in the macroreticular polystyrene type resin.

In the present invention, the form of the adsorbent of the present invention is not critical. For example, the adsorbent of the present invention may be of any of granular, spherical and particulate forms. Further, the adsorbent of the present invention may be of any other form than the abovementioned forms, e.g. membraneous or massive form prepared by the molding of the adsorbent having a granular, spherical on particulate form.

The adsorbent of the present invention may be qualitatively and quantitatively analyzed as follows.

The presence of the copper(I) in the adsorbent can be affirmed by X-ray photoelectron spectroscopy, e.g. using ESCA 750 (the trade name of an electron spectrometer manufactured and sold by Shimadzu Corporation, Japan).

The content of the copper(I) halide in the adsorbent can be determined as follows. The copper(I) halide in the adsorbent is extracted with concentrated nitric acid. The complete extraction can be affirmed by the fact that when the treated adsorbent is burnt, the resinous substance is burnt away without leaving any copper substances. After complete extraction of the copper(I) halide thus obtained is analyzed by atomic absorption spectroscopy to determine the amount of the copper(I) halide contained in the adsorbent, using, e.g. AA-646 (the trade name of an apparatus for an atomic adsorption analysis, manufactured and sold by Shimadzu Corporation, Japan).

Separately, the sample polymer which has been obtained by the above-mentioned washing treatment is subjected to $^1H$, $^{13}C$ or $^{14}N$ NMR analysis, elementary analysis and PGC (pyrolysis gas chromatography) [Takeuchi et al, "Kobunshi no Netsubunseki Gasukuromatogurafi" ("Thermal analysis gas chromatography for polymer"), page 79 (1977) published by Kagakudojin, Japan]to affirm the presence of amino groups and composition of the polymer. The content of the amino groups may be determined by the method as mentioned above.

That the polymer is macroreticular can be affirmed by the presence of pores in the polymer. The presence of pores can be affirmed using a mercury porosimeter. Further, that the polymer is macroreticular can also be affirmed by the fact that the polymer has a specific surface area of at least 1 $m^2/g$ in the dry state as measured according to the BET method using nitrogen.

According to another aspect of the present invention, there is provided a process for producing an adsorbent for use in the selective adsorption and separation of a gas from a gaseous mixture, which comprises mixing a macroreticular polystyrene type resin having amino groups selected from the group consisting of primary, secondary and tertiary amino groups and combinations thereof and a copper(I) halide in a solvent and removing the solvent.

In the present invention, a macroreticular polystyrene type resin is mixed with a copper(I) halide of the kind as mentioned before. The mixing may be performed by simply agitating the macroreticular polystyrene type resin and the copper(I) halide in a solvent.

The macroreticular polystyrene type resin having amino groups selected from the group consisting of primary, secondary and tertiary amino groups (hereinafter often referred to simply as "macroreticular polystyrene type resin") to be used as the raw material in the present invention has generally a granule size of 0.2 to 20 mm, preferably 0.5 to 10 mm in terms of weight average granule diameter, an average pore diameter of 10 to 1000 Å, more preferably 50 to 600 Å, a specific surface area of 1 to 1000 $m^2/g$, preferably 10 to 1000 $m^2/g$, more preferably 300 to 1000 $m^2/g$ in the dry state as measured according to the BET method using nitrogen.

The macroreticular polystyrene type resin to be used in the present invention may be prepared by customary methods which are used for producing an anion exchange resin. For example, the macroreticular polystyrene type resin may be prepared by copolymerizing a substituted or unsubstituted styrene such as styrene, methylstyrene or ethylstyrene and a divinyl aromatic compound such as divinylbenzene, chloromethylating the resulting crosslinked copolymer and then reacting the chloromethylated copolymer with at least one amine selected from primary, secondary and tertiary amines; by copolymerizing a chlorinated product of the substituted or unsubstituted styrene of the kind as mentioned above such as chloromethylstyrene with a divinyl aromatic compound such as divinylbenzene, and then reacting the resulting crosslinked copolymer with at least one amine selected from primary, secondary and tertiary amines; and by copolymerizing a substituted or unsubstituted styrene such as styrene, methylstyrene or ethylstyrene, styrene substituted with a substituted or unsubstituted amino group, and a divinyl aromatic compound such as divinylbenzene.

As the macroreticular polystyrene type resin, there may advantageously be used commercially available anion exchange resins having ion exchange groups selected from the group consisting of primary, secondary and tertiary amino groups and combinations thereof. As examples of such anion exchange resins, there may be mentioned AMBERLIST ® A-21, AMBERLITE ® IRA-68 AMBERLITE ® IRA-45 AMBERLITE ®35 AMBERLITE ® IRA-93, AMBERLITE ® IRA-94, AMBERLITE ® IRA-99, and AMBERLITE ® IRA-743 each supplied by Japan Organo Co., Ltd., Japan; DIAION ® CR20, DIAION ® WA 20, DIAION ® WA 21 and DIAION ® WA30 each supplied by Mistsubishi Chemical Industries Ltd., Japan; DOWEX ® MWA-1 supplied by the Dow Chemical Company, U.S.A. The commercially available macroreticular polystyrene type resin which may be used in the present invention is not limited to the above-mentioned resins, and may be any of those commercially available anion exchange resins which are of the macroreticular polystyrene type and have amino groups selected from primary, secondary and tertiary amino groups and combinations thereof.

As examples of the solvent which may be used in the present invention, there may be mentioned water, a 0.1-12 N aqueous hydrochloric acid, a 0.1-15 N aqueous ammonia, an alcohol having 1 to 6 carbon atoms such as methanol, ethanol, 1-propanol, 2-propanol or 1butanol, an α-olefin having 4 to 8 carbon atoms such as 1-butene, 1-pentene, 1-hexene, 1-heptene or 1-octene, a hydrocarbon cyanide having 2 to 8 carbon atoms such as acetonitrile, propionitrile, butyronitrile or benzonitrile, and a mixture of water and the above-mentioned hydrocarbon cyanide having 2 to 8 carbon atoms (water/hydrocarbon cyanide weight ratio: generally 0.05-20, preferably 0.5-2.0).

The ratio of the copper(I) halide to the macroreticular polystyrene type resin used is generally 0.1 or more, preferably 0.5 to 10, more preferably 1.0 to 10 in terms of milliequivalent of the copper(I) halide per milliequivalent of the amino groups contained in the macroreticular polystyrene type resin used.

The solvent is employed in an amount of 1.7 to 200 times, more preferably 5 to 200 times, by weight, the amount of the copper(I) halide used.

The time of mixing of the macroreticular polystyrene type resin and the copper(I) halide is not critical and may generally be 10 min. to 24 hours, preferably 1 to 20 hours.

The mixing temperature is also not critical and may generally be between the freezing point of the solvent and the boiling point of the solvent, i.e., generally 0° C. to 200° C.

The mixing pressure is also not restricted, and the mixing may usually be carried out at atmospheric pressure from a viewpoint of ease in operation.

After the mixing, the resulting mixture is then subjected to removal of the solvent. The method of removing the solvent is not critical and may generally be performed by maintaining the mixture at 20° to 120° C., preferably 60° to 90° C. under a pressure of $10^{-3}$ to 50 mmHg, preferably $10^{-1}$ to 10 mmHg for 10 min to 10 hours, preferably 1 to 6 hours. Thus, there is obtained an adsorbent of the present invention. The color of the resulting adsorbent is generally green or light green.

The above-prepared adsorbent of the present invention is advantageously employed for selective adsorption-separation of a gas from a gaseous mixture.

The adsorption of a gas on the adsorbent of the present invention may be performed by the customary adsorption method, i.e., by simply contacting a gaseous mixture with the adsorbent of the present invention. For example, the contact of the gaseous mixture with the adsorbent may be effected while circulating the gaseous mixture through a system containing the adsorbent using, for example, a gas pump until the adsorption of a component gas on the adsorbent reaches equilibrium. Alternatively, the contact of the gaseous mixture with the adsorbent may be effected by evacuating a system containing the adsorbent and then connecting the system to a container containing the gaseous mixture.

In practicing the adsorption of a gas on the adsorbent of the present invention may generally be effected under an atmospheric pressure or a superatmospheric pressure, usually not exceeding about 150 kg/cm²-gauge. When the adsorption of a gas on the adsorbent is effected under an atmospheric pressure, the temperature of the adsorption may be in the range of −40° to 90° C., preferably 0° to 40° C. On the other hand, when the adsorption of a gas on the adsorbent is effected under a super-atmospheric pressure, the temperature of the adsorption may be in the range of −50° to 160° C., preferably 50° to 120° C.

The desorption of the adsorbed gas may be performed by any of customary methods, for example, a method in which the adsorbent is heated to 40° to 140° C., preferably 60° to 90° C. under an atmospheric pressure; a method in which a system containing the adsorbent is evacuated at room temperature to $10^{-6}$ to 300 mmHg, preferably $10^{-1}$ to 50 mm Hg, and a method in which a system containing the adsorbent is evacuated to $10^{-1}$ to 700 mmHg while heating the adsorbent up to 40° to 140° C., preferably 60° to 90° C.

Since the adsorbent of the present invention is solid, the adsorption of a gas from a gaseous mixture on the adsorbent and desorption of the adsorbed gas may be performed in a fixed bed system and a fluidized bed system.

As described in the foregoing, the adsorbent of the present invention is excellent not only selectivity which respect to gas adsorption, particularly adsorption of carbon monoxide, an unsaturated hydrocarbon and acetylene, but also in efficiency of desorption of the adsorbed gas and, hence, can be advantageously used for the adsorption-separation of a gas from a gaseous mixture.

The present invention will now be illustrated in more detail by the following Examples that should not be construed as limiting the scope of the invention.

EXAMPLE 1

Copper(I) chloride (a special grade reagent, manufactured and sold by Koso Chemical Co., Ltd., Japan) is dissolved in concentrated hydrochloric acid. To the resulting solution is added water to reprecipitate the copper(I) chloride. The resulting precipitates are washed with ethanol and then with ethyl ether, and dried at 100° C. for 12 hours in vacuo. Thus, there is obtained a purified copper(I) chloride.

Separately, DIAION® WA20 (a granular macroreticular polystyrene type resin having primary and secondary amino groups, manufactured and sold by Mitsubishi Chemical Industries, Ltd., Japan; effective diameter, 0.35-0.55 mm; water content, 42%; specific surface area, more than 30 m²/g; content of the amino groups, 3.8 meq/g; color, a light yellow) is washed with ethanol and then dried at 80° C. for 12 hours in vacuo.

In an eggplant type flask having a capacity of 100 ml are charged 10.0 g (101 mmol) of copper(I) chloride which has been purified above, 10.0 g of DIAION® WA20 which has been treated above, and 80 ml of a mixture of water and acetonitrile as a solvent (water/acetonitrile volume ratio =1:1). The contents of the eggplant type flask are well mixed by means of a magnetic stirrer at 20° C. for 6 hours. Then, the resulting mixture is subjected to removal of the solvent at 80° C. for 4 hours under a pressure of 7 mmHg. Thus, there is obtained 16.7 g of a granular adsorbent having a green color.

The above-obtained adsorbent is analyzed by X-ray photoelectron spectroscopy using ESCA 750 (the trade name of an electron spectrometer manufactured and sold by Shimadzu Corporation, Japan). As a result, it is found that copper(I) is present but copper(II) is absent in the adsorbent.

Separately, the above-obtained adsorbent is repeatedly washed with concentrated nitric acid until copper(I) chloride fixed to the macroreticular polystyrene type resin is completely extracted from the adsorbent. Then, the above-obtained extract is analyzed by atomic absorption spectroscopy to determine the content of copper(I) chloride in the adsorbent using AA-646 (the trade name of an apparatus for an atomic adsorption analysis, manufactured and sold by Shimadzu Corporation, Japan). As a result, it is found that the amount of copper(I) chloride fixed to the macroreticular polystyrene type resin is 6.7 g, i.e. 1.8 milliequivalents per milliequivalent of the amino groups contained in the macroreticular polystyrene type resin.

In the same manner as mentioned above, an adsorbent of the present invention is produced. 16.7 g of the above-prepared adsorbent is charged in an eggplant type flask having a capacity of 100 ml. The eggplant type flask is connected to a container containing 800 ml of ethylene (pressure: 1 atm), and the ethylene is contacted with the adsorbent at 20° C. while stirring the adsorbent by means of a magnetic stirrer. Incidentally, the ethylene used herein and the working examples which will be given later is one which has been passed through a column packed with Molecular Sieves 4A (the trade name of a synthetic zeolite manufactured by Linde Co., U.S.A.) just before use. The amount of ethylene adsorbed on the adsorbent is determined by the gas burette method. As a result, it is found that the amounts of the ethylene gas adsorbed on the adsorbent by the mutual contact for 10 min., 30 min. and 100 min. are 8.9 mmol, 11.5 mmol and 13.3 mmol, respectively and that the adsorption of ethylene on the adsorbent reaches equilibrium 100 min. after the initiation of the contact of the adsorbent with ethylene.

Thereafter, the inside of the eggplant type flask is evacuated and maintained at 20° C. for 60 min. under a pressure of 5 mmHg to desorb the adsorbed ethylene from the adsorbent.

Subsequently, substantially the same procedures as mentioned above are repeated to adsorb ethylene on an adsorbent, except that the adsorbent from which the ethylene has been desorbed above is used. The amounts of ethylene adsorbed on the adsorbent are determined in the same manner as mentioned above. As a result, it is found that the amounts of ethylene adsorbed on the adsorbent by the mutual contact for 10 min., 30 min. and 100 min. are 7.1 mmol, 9.2 mmol and 10.7 mmol, respectively and that the equilibrium with respect to the adsorption of ethylene on the adsorbent reaches 100 min. after the initiation of the contact of the adsorbent with ethylene. Thereafter, the ethylene adsorbed on the adsorbent is desorbed in the same manner as mentioned above.

Then, substantially the same procedures as mentioned above are repeated to adsorb ethylene on an adsorbent, except that the adsorbent from which the ethylene has been desorbed just above is used. The amounts of ethylene adsorbed on the adsorbent are determined in the same manner as mentioned above. As a result, it is found that the amounts of ethylene adsorbed on the adsorbent by the mutual contact for 10 min., 30 min. and 100 min. are 7.1 mmol, 9.2 mmol and 10.6 mmol, respectively and that the adsorption of ethylene on the adsorbent reaches equilibrium 100 min. after the initiation of the contact of the adsorbent with ethylene.

In the same manner as mentioned above, the adsorption of ethylene on the adsorbent and desorption of the adsorbed ethylene are repeated 5 times. Despite the repeated use of the adsorbent there is caused little or no lowering in the adsorption rate and amount of ethylene adsorbed on the adsorbent.

In the same manner as mentioned above, the adsorbent of the present invention is prepared. 16.7 g of the above-prepared adsorbent is charged in an eggplant type flask having a capacity of 100 ml. The eggplant type flask is connected to a container containing 1.5 liters of ethane (pressure: 1 atm). The ethane in the container is contacted with the adsorbent at 20° C. while stirring the adsorbent by means of a magnetic stirrer. Incidentally, the ethane used herein is one which has been passed through a column packed with Molecular Sieves 4A (the trade name of a synthetic zeolite manufactured and sold by Linde Co., U.S.A.) just before use.

The amount of ethane adsorbed on the adsorbent is determined by the gas burette method. As a result, it is found that the adsorption of ethane on the adsorbent reaches equilibrium 60 min. after the initiation of the contact of ethane with the adsorbent and that the equilibrium adsorption amount of ethane is 1.8 mmol, i.e. the equilibrium adsorption of ethane is only 17% of that of ethylene.

In the same manner as mentioned above, the adsorbent of the present invention is prepared. 16.7 g of the above-prepared adsorbent is charged in an eggplant type flask having a capacity of 100 ml. The eggplant type flask is connected to a container containing 1.5 liters of carbon dioxide (pressure: 1 atm). The carbon dioxide in the container is contacted with the adsorbent at 20° C. while stirring the adsorbent by means of a magnetic stirrer.

The amount of carbon dioxide adsorbed on the adsorbent is determined by the gas burette method. As a result, it is found that the adsorption of ethane on the adsorbent reaches equilibrium 60 min. after the initiation of the contact of carbon dioxide with the adsorbent and that the equibrium adsorption amount of carbon dioxide is 0.5 mmol, i.e. the equibrium adsorption of carbon dioxide is only 3.8% of that of ethylene.

In the same manner as mentioned above, the adsorbent of the present invention is prepared. 16.7 g of the above-prepared adsorbent is charged in an eggplant type flask having a capacity of 100 ml. The eggplant type flask is connected to a container containing 1.5 liters of hydrogen (pressure: 1 atm). The hydrogen in the container is contacted with the adsorbent at 20° C. while stirring the adsorbent by means of a magnetic stirrer.

The amount of hydrogen adsorbed on the adsorbent is determined by the gas burette method. As a result, it is found that little or no hydrogen is adsorbed on the adsorbent even by the 60 min. contact therebetween.

In the same manner as mentioned above, the adsorbent of the present invention is prepared. 16.7 g of the above-prepared adsorbent is charged in an eggplant type flask having a capacity of 100 ml. The eggplant type flask is connected to a container containing 1.5 liters of methane (pressure: 1 atm). The methane in the container is contacted with the adsorbent at 20° C. while stirring the adsorbent by means of a magnetic stirrer.

The amount of methane adsorbed on the adsorbent is determined by the gas burette method. As a result, it is found that little or no methane is adsorbed on the adsorbent even by the 60 min. contact therebetween.

As is apparent from the above results, the adsorbent of the present invention can be advantageously used for selectively separating an unsaturated hydrocarbon from a gaseous mixture.

EXAMPLE 2

An adsorbent of the present invention is prepared in substantially the same manner as in Example 1, except that 80 ml of water is used as solvent instead of a mixture of water and acetonitrile. Thus there is obtained 16.9 g of a granular adsorbent having a green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 6.9 g, i.e. about 1.8 milliequivalents per milliequivalent of the amino groups contained in the macroreticular polystyrene type resin used.

In the same manner as mentioned above, an adsorbent of the present invention is produced. 16.9 g of the above-prepared adsorbent is charged in an eggplant type flask having a capacity of 100 ml. The eggplant type flask is connected to a container containing 800 ml of ethylene (pressure: 1 atm). The ethylene in the container is contacted with the adsorbent at 20° C. while stirring the adsorbent with a magnetic stirrer. The amount of ethylene adsorbed on the adsorbent is determined by the gas burette method. As a result, it is found that the amounts of ethylene adsorbed on the adsorbent by the mutual contact for 10 min., 30 min. and 90 min. are 5.9 mmol, 8.4 mmol and 10.6 mmol, respectively and that the adsorption of ethylene on the adsorbent reaches equilibrium 100 min. after the initiation of the contact of the adsorbent with ethylene.

Thereafter, the inside of the eggplant type flask is evacuated and maintained at 20° C. for 60 min. under a pressure of 5 mmHg to desorb the adsorbed ethylene from the adsorbent.

Subsequently, substantially the same procedures as mentioned above are repeated to adsorb ethylene on an adsorbent, except that the adsorbent from which the ethylene has been desorbed above is used. The amount of ethylene adsorbed on the adsorbent is determined in the same manner as mentioned above. As a result, it is found that the amounts of ethylene adsorbed on the adsorbent by the mutual contacts for 10 min, 30 min and 100 min are 5.9 mmol, 8.2 mmol and 10.5 mmol, respectively and that the adsorption of ethylene on the adsorbent reaches equilibrium 90 min after the initiation of the contact of the adsorbent with ethylene. Thereafter, the ethylene adsorbed on the adsorbent is desorbed in the same manner as mentioned above.

Then, substantially the same procedures as mentioned above are repeated to adsorb ethylene on an adsorbent, except that the adsorbent from which the ethylene has been desorbed just above is used. The amount of ethylene adsorbed on the adsorbent is determined in the same manner as mentioned above. As a result, it is found that the amounts of ethylene adsorbed on the adsorbent by the mutual contact for 10 min, 30 min and 100 min are 5.9 mmol, 8.2 mmol and 10.6 mmol, respectively and that the adsorption of ethylene on the adsorbent reaches equilibrium 100 min after the initiation of the contact of the adsorbent with ethylene. In the same manner as mentioned above, the adsorption of ethylene on the adsorbent and desorption of the adsorbed ethylene are repeated 5 times. Despite the repeated use of the adsorbent there is caused little or no lowering in the adsorption rate of ethylene and amount of ethylene adsorbed on the adsorbent.

EXAMPLE 3

In the same manner as in Example 1, an adsorbent of the present invention is produced. 16.7 g of the above-prepared adsorbent is charged in an eggplant type flask having a capacity of 100 ml. The eggplant type flask is connected to a container containing 800 ml of ethylene (pressure: 1 atm). The ethylene in the container is contacted with the adsorbent at 20° C. while stirring the adsorbent by means of a magnetic stirrer. The amount of ethylene adsorbed on the adsorbent is determined by the gas burette method. As a result, it is found that the amounts of ethylene adsorbed on the adsorbent by the mutual contact for 10 min, 30 min and 100 min are 8.9 mmol, 11.5 mmol and 13.3 mmol, respectively and that the adsorption of ethylene on the adsorbent reaches equilibrium 100 min after the initiation of the contact of the adsorbent with ethylene.

Thereafter, the contents of the eggplant type flask are heated and maintained at 80° C. for 30 min under a pressure of 5 mmHg to desorb the adsorbed ethylene from the adsorbent.

Subsequently, substantially the same procedures as mentioned above are repeated to adsorb ethylene on an adsorbent, except that the adsorbent from which the ethylene has been desorbed is used. The amount of ethylene adsorbed on the adsorbent is determined in the same manner as mentioned above. As a result, it is found that the amounts of ethylene adsorbed on the adsorbent by the mutual contact for 10 min and 100 min are 8.2 mmol and 12.2 mmol, respectively and that the adsorption of ethylene on the adsorbent reaches equilibrium 100 min after the initiation of the contact of the adsorbent with ethylene. Thereafter, ethylene adsorbed on the adsorbent is desorbed in the same manner as mentioned above.

Thereafter, in the same manner as mentioned above, the adsorption of ethylene on the adsorbent and desorption of the adsorbed ethylene are repeated 2 times. Despite the repeated use of the adsorbent there is caused little or no lowering in the adsorption rate of ethylene and amount of ethylene adsorbed on the adsorbent.

EXAMPLE 4

In the same manner as in Example 1, an adsorbent of the present invention is produced. 16.7 g of the above-prepared adsorbent is charged in an eggplant type flask having a capacity of 100 ml. The eggplant type flask is connected to a container containing 800 ml of ethylene (pressure: 1 atm). The ethylene in the container is contacted with the adsorbent at 20 ° C. while stirring the adsorbent by means of a magnetic stirrer. The amount of ethylene adsorbed on the adsorbent is determined by the gas burette method. As a result, it is found that the amounts of ethylene adsorbed on the adsorbent by the mutual contact for 10 min and 120 min are 8.8 mmol and 13.2 mmol, respectively and that the adsorption of ethylene on the adsorbent reaches equilibrium 120 min after the initiation of the contact of the adsorbent with ethylene.

Thereafter, the contents of the eggplant flask are heated to 80° C. and maintained at 80° C. to desorb the adsorbed ethylene. The amount of ethylene desorbed from the adsorbent is determined by gas chromatography. As a result, it is found that the amount of ethylene desorbed reaches 9.7 mmol 10 min after the initiation of the desorption of the adsorbed ethylene and that, thereafter, little or no ethylene is desorbed from the adsorbent.

EXAMPLE 5

An adsorbent of the present invention is prepared in substantially the same manner as in Example 1, except that 80 ml of acetonitrile is used as solvent instead of a mixture of water and acetonitrile. Thus there is obtained 17.0 g of a granular adsorbent having a green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 7.0 g, i.e. about 1.9 milliequivalents per milliequivalent of the amino groups contained in the macroreticular polystyrene type resin used.

In the same manner as mentioned above, an adsorbent of the present invention is produced. 17.0 g of the above-prepared adsorbent is charged in an eggplant type flask having a capacity of 100 ml. The eggplant type flask is connected to a container containing 800 ml of ethylene (pressure: 1 atm). The ethylene in the container is contacted with the adsorbent at 20° C. while stirring the adsorbent by means of a magnetic stirrer. The amount of ethylene adsorbed on the adsorbent is determined by the gas burette method. As a result, it is found that the amounts of the ethylene gas adsorbed on the adsorbent by the mutual contact for 10 min, 30 min and 60 min are 11.8 mmol, 13.9 mmol and 14.4 mmol, respectively and that the adsorption of ethylene on the adsorbent reaches equilibrium 60 min after the initiation of the contact of the adsorbent with ethylene.

Thereafter, the inside of the eggplant type flask is evacuated and maintained at 20° C. for 60 min under a pressure of 5 mmHg to desorb the adsorbed ethylene from the adsorbent.

Subsequently, substantially the same procedures as mentioned above are repeated to adsorb ethylene on an adsorbent, except that the adsorbent from which ethylene has been desorbed is used. The amounts of ethylene adsorbed on the adsorbent are determined in the same manner as mentioned above. As a result, it is found that the amounts of ethylene adsorbed on the adsorbent by the mutual contact for 10 min, 30 min and 60 min are 8.5 mmol, 11.1 mmol and 11.8 mmol, respectively and that the adsorption of ethylene on the adsorbent reaches equilibrium 90 min after the initiation of the contact of the adsorbent with ethylene. Thereafter, the ethylene adsorbed on the adsorbent is desorbed in the same manner as mentioned above.

Then, substantially the same procedures as mentioned above are repeated to adsorb ethylene on an adsorbent, except that the adsorbent from which the ethylene has been desorbed just above is used. The amount of ethylene adsorbed on the adsorbent is determined in the same manner as mentioned above. As a result, it is found that the amounts of ethylene adsorbed on the adsorbent by the mutual contact for 10 min and 60 min are 8.5 mmol and 11.8 mmol, respectively and that the adsorption of ethylene on the adsorbent reaches equilibrium 60 min after the initiation of the contact of the adsorbent with ethylene.

Thereafter, in the same manner as mentioned above, the adsorption of ethylene on the adsorbent and desorption of the adsorbed ethylene are repeated 5 times. Despite the repeated use of the adsorbent there is caused little or no lowering in the adsorption rate of ethylene and amount of ethylene adsorbed on the adsorbent.

EXAMPLE 6

In an eggplant type flask having a capacity of 100 ml are placed 10.0 g (101 mmol) of copper(I) chloride which has been purified in Example 1, 10.0 g of DIAION ®WA20 which has been treated in Example 1, and 80 ml of 1-hexene as a solvent. Incidentally, 1-hexene used herein is one obtained by dehydrating 1-hexene (a special grade reagent, manufactured and sold by Yoneyama Yakuhin Kogyo Co., Ltd., Japan) with metallic sodium and then subjecting the dehydrated 1-hexane to distillation.

The contents of the eggplant type flask are stirred with a magnetic stirrer at −31° C. to −50° C. for 4 hours. Subsequently, the resulting mixture is allowed to stand at room temperature for 12 hours and then subjected to removal of the solvent at 80° C. for 2 hours under a pressure of 7 mmHg. Thus, there is obtained 15.1 g of a granular adsorbent having a green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 5.1 g, i.e. about 1.4 milliequivalents per milliequivalent of the amino groups contained in the macroreticular polystyrene type resin used.

In the same manner as mentioned above, an adsorbent of the present invention is produced. 15.1 g of the above-prepared adsorbent is charged in an eggplant type flask having a capacity of 100 ml. The eggplant type flask is connected to a container containing 800 ml of ethylene (pressure: 1 atm). The ethylene contained in the container is contacted with the adsorbent at 20° C. while stirring the adsorbent by means of a magnetic stirrer. The amount of ethylene adsorbed on the adsorbent is determined by the gas burette method. As a result, it is found that the amounts of the ethylene gas adsorbed on the adsorbent by the mutual contact for 10 min, 30 min and 60 min are 8.2 mmol, 11.9 mmol and 13.4 mmol, respectively and that the adsorption of ethylene on the adsorbent reaches equilibrium 60 min after the initiation of the contact of the adsorbent with ethylene.

Thereafter, the contents of the eggplant type flask are heated to 80° C. and maintained at 80° C. for 40 min under a pressure of 5 mmHg to desorb the adsorbed ethylene from the adsorbent.

Subsequently, substantially the same procedures as mentioned above are repeated to adsorb ethylene on an adsorbent, except that the adsorbent from which the ethylene has been desorbed above is used. The amount of ethylene adsorbed on the adsorbent is determined in the same manner as mentioned above. As a result, it is found that the amounts of ethylene adsorbed on the adsorbent by the mutual contact for 10 min, 30 min and 60 min are 7.8 mmol, 10.8 mmol and 12.4 mmol, respectively and that the adsorption of ethylene on the adsorbent reaches equilibrium 60 min after the initiation of the contact of the adsorbent with ethylene.

EXAMPLE 7

In an eggplant type flask having a capacity of 100 ml are charged 7.5 g (52 mmol) of copper(I) bromide (a special grade reagent, manufactured and sold by Yoneyama Yakuhin Kogyo Co., Ltd., Japan), 5.1 g of DIAION ®WA20 which has been treated in Example 1, and 80 ml of a mixture of water and acetonitrile (water/acetonitrile volume ratio =1:1) as a solvent.

The contents of the flask are stirred by means of a magnetic stirrer at 20° C. for 6 hours. Subsequently, the resulting mixture is subjected to removal of the solvent at 80° C. for 2 hours under a pressure of 7 mmHg. Thus, there is obtained 10.1 g of a granular adsorbent having a green color.

The above-obtained adsorbent is analyzed by X-ray photoelectron spectroscopy in substantially the same manner as in Example 1. As a result, it is confirmed that copper(I) is present but copper(II) is absent in the adsorbent.

In the same manner as mentioned above, an adsorbent of the present invention is produced. 10.1 g of the above-prepared adsorbent is charged in an eggplant type flask having a capacity of 100 ml. The eggplant type flask is connected to a container containing 800 ml of ethylene (pressure: 1 atm). The ethylene contained in the container is contacted by means of the adsorbent at 20° C. while stirring the adsorbent with a magnetic stirrer. The amount of ethylene adsorbed on the adsorbent is determined by the gas burette method. As a result, it is found that the amounts of ethylene adsorbed on the adsorbent by the mutual contact for 10 min, 30 min, 60 min and 120 min are 2.5 mmol, 3.5 mmol, 4.1 mmol and 4.5 mmol, respectively and that the adsorption of ethylene on the adsorbent reaches equilibrium 120 min after the initiation of the contact of the adsorbent with ethylene.

EXAMPLE 8

DIAION ®CR20 (a granular macroreticular polystyrene type resin having primary and secondary amino groups, manufactured and sold by Mitsubishi Chemical Industries, Ltd., Japan; effective diameter, 0.35–0.55mm; water content, 55%; specific surface area, more than 30 m$^2$/g; content of the amino groups, 0.6 meq/g; color, a light yellow) is washed with ethanol and then dried at 80° C. for 12 hours in vacuo.

An adsorbent of the present invention is prepared in substantially the same manner as in Example 5, except that DIAION ®CR20 which has been treated above is used instead of DIAION ®WA20. Thus there is obtained 13.5 g of a granular adsorbent having a green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 3.5 g, i.e. about 5.9 milliequivalents per milliequivalent of the amino groups contained in the macroreticular polystyrene type resin used.

In the same manner as mentioned above, an adsorbent of the present invention is produced. 13.5 g of the above-prepared adsorbent is charged in an eggplant type flask having a capacity of 100 ml. The eggplant type flask is connected to a container containing 800 ml of ethylene (pressure: 1 atm). The ethylene contained in the container is contacted with the adsorbent at 20° C. while stirring the adsorbent by means of a magnetic stirrer. The amount of ethylene adsorbed on the adsorbent is determined by the gas burette method. As a result, it is found that the amounts of ethylene adsorbed on the adsorbent by the mutual contact for 10 min, 30 min and 60 min are 7.2 mmol, 7.9 mmol and 8.1 mmol, respectively and that the adsorption of ethylene on the adsorbent reaches edquilibrium 60 min after the initiation of the contact of the adsorbent with ethylene.

Thereafter, the inside of the eggplant type flask is evacuated and maintained at 20° C. for 10 min under a pressure of 5 mmHg to desorb the adsorbed ethylene from the adsorbent.

Subsequently, substantially the same procedures as mentioned above are repeated to adsorb ethylene on an adsorbent, except that the adsorbent from which the ethylene has been desorbed above is used. The amount of ethylene adsorbed on the adsorbent is determined in the same manner as mentioned above. As a result, it is found that the amounts of ethylene adsorbed on the adsorbent by the mutual contact for 10 min, 30 min and 60 min are 6.3 mmol, 6.7 mmol and 7.1 mmol, respectively and that the adsorption of ethylene on the adsorbent reaches equilibrium 60 min after the initiation of the contact of the adsorbent with ethylene. Thereafter, the ethylene adsorbed on the adsorbent is desorbed in the same manner as mentioned above.

Then, substantially the same procedures as mentioned above are repeated to adsorb ethylene on an adsorbent, except that the adsorbent from which the ethylene has been desorbed just above is used. The amount of ethylene adsorbed on the adsorbent is determined in the same manner as mentioned above. As a result, it is found that the amounts of ethylene adsorbed on the adsorbent by the mutual contact for 10 min and 60 min are 6.3 mmol and 7.1 mmol, respectively and that the adsorption of ethylene on the adsorbent reaches equilibrium 60 min after the initiation of the contact of the adsorbent with ethylene.

In the same manner as mentioned above, the adsorption of ethylene on the adsorbent and desorption of the adsorbed ethylene are repeated 5 times. Despite the repeated use of the adsorbent there is observed little or no lowering in the adsorption rate of ethylene and amount of ethylene adsorbed on the adsorbent.

EXAMPLE 9

AMBERLITE ®IRA-94 (a granular macroreticular polystyrene type resin having tertiary amino groups, manufactured and sold by Japan Organo Co., Ltd., Japan; effective diameter, 0.34–0.47 mm; water content, 57%; specific surface area, more than 30 m$^2$/g; content of the amino groups, 7.2 meq/g; color, white) is washed with ethanol and then dried at 80° C. for 12 hours in vacuo.

An adsorbent of the present invention is prepared in substantially the same manner as in Example 5, except that AMBERLITE ®IRA-94 which has been treated above is used instead of DIAION ®WA20 and that the removal of the solvent is effected for 3 hours instead of 4 hours. Thus, there is obtained 15.0 g of a granular adsorbent having a green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 5.0 g, i.e. about 0.7 milliequivalents per milliequivalent of the amino groups contained in the macroreticular polystyrene type resin used.

In the same manner as mentioned above, an adsorbent of the present invention is produced. 15.0 g of the above-prepared adsorbent is charged in an eggplant type flask having a capacity of 100 ml. The eggplant type flask is connected to a container containing 800 ml of ethylene (pressure: 1 atm). The ethylene contained in the container is contacted with the adsorbent at 20° C. while stirring the adsorbent by means of a magnetic stirrer. The amount of ethylene adsorbed on the adsorbent is determined by the gas burette method. As a result, it is found that the amounts of the ethylene gas adsorbed on the adsorbent by the mutual contact for 10 min, 30 min and 120 min are 5.2 mmol, 6.1 mmol and 7.4 mmol, respectively and that the adsorption of ethylene on the adsorbent reaches equilibrium 120 min after the initiation of the contact of the adsorbent with ethylene.

EXAMPLE 10

DIAION ®WA30 (a granular macroreticular polystyrene type resin having tertiary amino groups, manufactured and sold by Mitsubishi Industries, Ltd., Japan; effective diameter, 0.35–0.55 mm; water content, 50%; specific surface area, more than 30 $m^L$/g content of the amino groups, 2.4 meq/g; color, a light yellow) is washed with ethanol and then dried at 80° C. for 12 hours in vacuo.

An adsorbent of the present invention is prepared in substantially the same manner as in Example 9, except that DIAION ®WA30 which has been treated above is used instead of AMBERLITE ®IRA-94. Thus, there is obtained 16.0 g of a granular adsorbent having a green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 6.0 g, i.e. about 2.5 milliequivalents per milliequivalent of the amino groups contained in the macroreticular polystyrene type resin used.

In the same manner as mentioned above, an adsorbent of the present invention is produced. 16.0 g of the above-prepared adsorbent is charged in an eggplant type flask having a capacity of 100 ml. The eggplant type flask is connected to a container containing 800 ml of ethylene (pressure: 1 atm). The ethylene contained in the container is contacted with the adsorbent at 20° C. while stirring the adsorbent by means of a magnetic stirrer. The amount of ethylene adsorbed on the adsorbent is determined by the gas burette method. As a result, it is found that the amounts of the ethylene gas adsorbed on the adsorbent by the mutual contact for 10 min, 30 min and 100 min are 4.8 mmol, 5.3 mmol and 5.7 mmol, respectively and that the adsorption of ethylene on the adsorbent reaches equilibrium 100 min after the initiation of the contact of the adsorbent with ethylene.

EXAMPLE 11

In an eggplant type flask having a capacity of 100 ml are placed 1.0 g (10.1 mmol) of copper(I) chloride which has been purified in Example 1, 5.0 g of DIAION ®WA20 which has been treated in Example 1, and 30 ml of water as a solvent.

The contents of flask are stirred by means of a magnetic stirrer at 20° C. for 6 hours. Subsequently, the resulting mixture is subjected to removal of the solvent at 80° C. for 4 hours under a pressure of 7 mmHg. Thus, there is obtained 5.75 g of a granular adsorbent having a green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 0.75 g, i.e. about 0.4 milliequivalent per milliequivalent of the amino groups contained in the macroreticular polystyrene type resin used.

In the same manner as mentioned above, an adsorbent of the present invention is produced. 5.75 g of the above-prepared adsorbent is charged in an eggplant type flask having a capacity of 100 ml. The eggplant type flask is connected to a container containing 800 ml of ethylene (pressure: 1 atm). The ethylene contained in the container is contacted with the adsorbent at 20° C. while stirring the adsorbent by means of a magnetic stirrer. The amount of ethylene adsorbed on the adsorbent is determined by the gas burette method. As a result, it is found that the amounts of the ethylene gas adsorbed on the adsorbent by the mutual contact for 10 min and 30 min are 4.0 mmol and 4.3 mmol, respectively and that the adsorption of ethylene on the adsorbent reaches equilibrium 30 min after the initiation of the contact of the adsorbent with ethylene.

Thereafter, the contents of the eggplant type flask are maintained at 20° C. for 40 min under a pressure of 5 mmHg to desorb the adsorbed ethylene from the adsorbent.

Subsequently, substantially the same procedures as mentioned above are repeated to adsorb ethylene on an adsorbent, except that the adsorbent from which the ethylene has been desorbed above is used. The amount of ethylene adsorbed on the adsorbent is determined in the same manner as mentioned above. As a result, it is found that the amounts of ethylene adsorbed on the adsorbent by the mutual contact for 10 min and 30 min are 3.2 mmol and 3.3 mmol, respectively and that the adsorption of ethylene on the adsorbent reaches equilibrium 30 min after the initiation of the contact of the adsorbent with ethylene.

EXAMPLE 12

In an eggplant type flask having a capacity of 100 ml are charged 1.0 g (10.1 mmol) of copper(I) chloride which has been purified in Example 1, 10.0 g of DIAION ®WA20 which has been treated in Example 1, and 80 ml of acetonitrile as a solvent.

The contents of the eggplant type flask are stirred by means of a magnetic stirrer at 20° C. for 15 hours. Subsequently, the resulting mixture is subjected to removal of the solvent at 80° C. for 2 hours under a pressure of 5 mmHg. Thus, there is obtained 10.7 g of a granular adsorbent having a green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 0.7 g, i.e. about 0.2 milliequivalent per milliequivalent of the amino groups contained in the macroreticular polystyrene type resin used.

In the same manner as mentioned above, an adsorbent of the present invention is produced. 10.7 g of the above-prepared adsorbent is charged in an eggplant type flask having a capacity of 100 ml. The eggplant type flask is connected to a container containing 800 ml of ethylene (pressure: 1 atm). The ethylene contained in the container is contacted with the adsorbent at 20° C. while stirring the adsorbent by means of a magnetic stirrer. The amount of the ethylene gas adsorbed on the adsorbent is determined by the gas burette method. As a result, it is found that the amounts of the ethylene gas adsorbed on the adsorbent by the mutual contact for 10 min, 30 min and 60 min are 6.2 mmol, 6.7 mmol and 6.9 mmol, respectively and that the adsorption of ethylene on the adsorbent reaches equilibrium 60 min after the initiation of the contact of the adsorbent with ethylene.

Thereafter, the contents of the eggplant type flask is maintained at 20° C. for 30 min under a pressure of 5 mmHg to desorb the adsorbed ethylene from the adsorbent.

Subsequently, substantially the same procedures as mentioned above are repeated to adsorb ethylene on an adsorbent, except that the adsorbent from which the ethylene has been desorbed above is used. The amount of ethylene adsorbed on the adsorbent is determined in the same manner as mentioned above. As a result, it is found that the amounts of ethylene adsorbed on the adsorbent by the mutual contact for 10 min, 30 min and 60 min are 6.2 mmol, 6.6 mmol and 6.7 mmol, respectively and that the adsorption of ethylene on the adsorbent reaches equilibrium 60 min after the initiation of the contact of the adsorbent with ethylene.

EXAMPLE 13

In the same manner as in Example 1, an adsorbent of the present invention is produced. 16.7 g of the above-prepared adsorbent is charged in an eggplant type flask having a capacity of 100 ml. The eggplant type flask is connected to a container containing 800 ml of propylene (pressure: 1 atm), and the propylene in the container is contacted with the adsorbent at 20° C. while stirring the adsorbent by means of a magnetic stirrer. The amount of propylene adsorbed on the adsorbent is determined by the gas burette method. As a result, it is found that the amounts of propylene adsorbed on the adsorbent by the mutual contact for 10 min, 30 min and 100 min are 3.9 mmol, 5.2 mmol and 7.3 mmol, respectively and that the adsorption of propylene on the adsorbent reaches equilibrium 100 min after the initiation of the contact of the adsorbent with propylene.

EXAMPLE 14

An adsorbent of the present invention is prepared in substantially the same manner as in Example 1, except that the amount of copper(I) chloride used is 15 g instead of 10 g.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 7.2 g, i.e. about 1.9 milliequivalents per milliequivalent of the amino groups contained in the macroreticular polystyrene type resin used.

In the same manner as mentioned above, an adsorbent of the present invention is produced. 17.2 g of the above-prepared adsorbent is charged in an eggplant type flask having a capacity of 100 ml. The eggplant type flask is connected to a container containing 847 ml of a gaseous mixture of ethylene and ethane (pressure, 1 atm; ethylene/ethane volume ratio =1:1), and the gaseous mixture is contacted at 25° C. with the adsorbent. The amount of the gaseous mixture adsorbed on the adsorbent is determined by the gas burette method. As a result, it is found that 210 ml of the gaseous mixture is adsorbed on the adsorbent by the mutual contact for 2 hours and that, thereafter, there is caused little or no adsorption of the gaseous mixture on the adsorbent. The residual gas is analyzed using 701-type Gas Chromatograph (a gas chromatograph manufactured and sold by Ohkura Rikagaku Kenkyusho Co., Ltd., Japan; packing material, Porapak Q manufactured and sold by Gasukuro Kogyo Inc., Japan; column temperature, 110° C.; carrier gas, helium). As a result, it is found that the ethylene/ethane molar ratio in the residual gas is 1:1.6, and that, therefore, the amount of ethane adsorbed on the adsorbent is 32 ml while the amount of ethylene adsorbed on the adsorbent is 179 ml, i.e. 5.6 times, by volume, the amount of ethane adsorbed on the adsorbent.

EXAMPLES 15 TO 17

Three kinds of adsorbents which are different from each other in the amount of copper(I) chloride fixed to the macroreticular polystyrene type resin are prepared in substantially the same manner as in Example 1, except that the amount of copper(I) chloride used is changed as shown in Table 1 given below.

With respect to the above-obtained adsorbents, tests on the adsorption of ethylene and ethane are effected to determine the equilibrium adsorption amount of each gas in substantially the same manner as in Example 1, except that the above-obtained adsorbents are used instead of the adsorbent used in Example 1. The results obtained are shown in Table 1 given below.

TABLE 1

| Ex. No. | Cu(I) chloride Amount used (g) | Macroreticular polystyrene type resin Amount used (g) | Amount of Cu(I) chloride adsorbed on the resin (meq of Cu(I) chloride per meq of the amino groups contained in the resin) | Equilibrium adsorption amount of gas | | |
|---|---|---|---|---|---|---|
| | | | | ethylene (mmol) [A] | ethane (mmol) [B] | [A]/[B] |
| 15 | 4.0 | 10 | 1.0 | 10.2[*1] | 4.3[*2] | 2.3 |
| 16 | 6.5 | " | 1.5 | 12.8[*1] | 2.9[*2] | 4.4 |
| 17 | 15 | " | 1.9 | 15.0[*1] | 1.9[*2] | 7.9 |

Note:
[*1] The adsorption of ethylene reaches equilibrium about 120 min after the initiation of the contact of ethylene with the adsorbent.
[*2] The adsorption of ethane reaches equilibrium about 60 min after the initiation of the contact of ethane with the adsorbent.

EXAMPLE 18

In an eggplant type flask having a capacity of 100 ml are charged in a dried nitrogen atmosphere 9.9 g (100 mmol) of copper(I) chloride which has been purified in Example 1, 10.0 g of DIAION ®WA20 which has been treated in Example 1 and 100 ml of a mixture of water and acetonitrile (water/acetonitrile volume ratio =1:1) as a solvent.

The contents of flask are stirred by means of a magnetic stirrer at 20° C. for 6 hours. Subsequently, the resulting mixture is subjected to removal of the solvent at 80° C. for 4 hours under a pressure of 6 mmHg. Thus, there is obtained 16.7 g of a granular adsorbent having a light green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 6.7 g, i.e. about 1.8 milliequivalents per milliequivalent of the amino groups contained in the macroreticular polystyrene type resin used.

In the same manner as mentioned above, an adsorbent of the present invention is produced. 16.7 g of the above-prepared adsorbent is charged in an eggplant type flask having a capacity of 100 ml. The eggplant type flask is connected to a container containing 1.5 liters of a gaseous mixture of carbon monoxide and nitrogen (partial pressure: carbon monoxide, 0.9 atm; nitrogen, 0.1 atm), and the gaseous mixture is contacted with the adsorbent at 20° C. while stirring the adsorbent by means of a magnetic stirrer. In this connection, the gaseous mixture is circulated through the eggplant type flask using a gas pump (B-106T type gas pump manufactured and sold by Iwaki K. K., Japan) during the initial 10 min period of the contact of the gaseous mixture with the adsorbent. The amount of carbon mnonoxide adsorbed on the adsorbent is determined at 20° C. by the gas burette method. As a result, it is found that the amounts of carbon monoxide adsorbed on the adsorbent by the mutual contact for 3 min and 60 min are 5.5 mmol and 16.5 mmol, respectively and that, thereafter, there is caused little or no adsorption of ethylene on the adsorbent.

Thereafter, the contents of the eggplant type flask are maintained at 20° C. for 10 min under a pressure of 0.2 mmHg to desorb the adsorbed carbon monoxide from the adsorbent.

Subsequently, substantially the same procedures as mentioned above are repeated to adsorb carbon monoxide on an adsorbent, except that the adsorbent from which the carbon monoxide has been desorbed above is used. The amount of carbon monoxide adsorbed on the adsorbent is determined in the same manner as mentioned above. As a result, it is found that the amounts of carbon monoxide adsorbed on the adsorbent by the mutual contact for 3 min and 60 min are 3.9 mmol and 8.3 mmol, respectively and that, thereafter, there is caused little or no adsorption of ethylene on the adsorbent.

Thereafter, the contents of the eggplant type flask are maintained at 20° C. for 60 min under a pressure of 0.2 mmHg to desorb the adsorbed carbon monoxide from the adsorbent.

Subsequently, substantially the same procedures as mentioned above are repeated to adsorb carbon monoxide on an adsorbent, except that the adsorbent from which the carbon monoxide has been desorbed above is used. The amount of carbon monoxide adsorbed on the adsorbent is determined in the same manner as mentioned above. As a result, it is found that the amount of carbon monoxide adsorbed on the adsorbent in a contact period of 60 min is 8.2 mmol and that, thereafter, there is caused little or no adsorption of ethylene on the adsorbent.

In the same manner as mentioned above, the adsorption of carbon monoxide on the adsorbent and desorption of the adsorbed carbon monoxide are repeated 5 times. Despite the repeated use of the adsorbent there is observed little or no lowering in the adsorption rate of carbon monoxide and amount of carbon monoxide adsorbed on the adsorbent.

In the same manner as mentioned above, the adsorbent of the present invention is produced. 16.7 g of the above-prepared adsorbent is charged in an eggplant type flask having a capacity of 100 ml. The inside of the flask is evacuated and maintained at 20° C. for 10 min under a pressure of 0.2 mmHg. Then, the eggplant type flask is connected to a container containing 1.5 liters of carbon dioxide, and the carbon dioxide in the container is contacted with the adsorbent while stirring the adsorbent with a magnetic stirrer. The amount of carbon dioxide adsorbed on the adsorbent is determined by the gas burette method. As a result, it is found that the adsorption of carbon dioxide on the adsorbent reaches equilibrium 60 min. after the initiation of the contact of carbon dioxide with the adsorbent and that the equibrium adsorption amount of carbon dioxide is 0.5 mmol.

In the same manner as mentioned above, an adsorbent of the present invention is prepared. 16.7 g of the above-prepared adsorbent is charged in an eggplant type flask having a capacity of 100 ml. The inside of the flask is evacuated and maintained at 20° C. for 10 min. under a pressure of 0.2 mmHg. Then, the eggplant type flask is connected to a container containing 1.5 liters of hydrogen, and the hydrogen in the container is contacted with the adsorbent while stirring the adsorbent by means of a magnetic stirrer. The amount of hydrogen adsorbed on the adsorbent is determined by the gas burette method. As a result, it is found that no hydrogen is adsorbed on the adsorbent even by the 60 min. contact therebetween.

In the same manner as mentioned above, the adsorbent of the present invention is prepared. 16.7 g of the above-prepared adsorbent is charged in an eggplant type flask having a capacity of 100 ml. The inside of the flask is evacuated and maintained at 20° C. for 10 min. under a pressure of 0.2 mmHg. Then, the flask is connected to a container containing 1.5 liters of methane, and the methane in the container is contacted with the adsorbent while stirring the adsorbent by means of a magnetic stirrer. The amount of methane adsorbed on the adsorbent is determined by the gas burette method. As a result, it is found that no methane is adsorbed on the adsorbent even by the 60 min. contact therebetween.

In the same manner as mentioned above, the adsorbent of the present invention is prepared. The aboveprepared adsorbent is charged in an eggplant type flask having a capacity of 100 ml. The inside of the flask is evacuated and maintained at 20° C. for 10 min. under a pressure of 0.2 mmHg. Then, the flask is connected to a container containing 1.5 liters of nitrogen, and the nitrogen in the container is contacted with the adsorbent while stirring the adsorbent by means of a magnetic stirrer. The amount of nitrogen adsorbed on the adsorbent is determined by the gas burette method. As a result, it is found that no nitrogen is adsorbed on the adsorbent even by the 60 min. contact therebetween.

EXAMPLE 19

In the same manner as in Example 18, an adsorbent of the present invention is produced. 16.7 g of the above-obtained adsorbent is charged in an eggplant type flask having a capacity of 100 ml. The eggplant type flask is connected to a container containing 1.5 liters of a gaseous mixture of carbon monoxide and nitrogen (partial pressure: carbon monoxide, 0.9 atm; nitrogen, 0.1 atm). The gaseous mixture in the container is contacted at 20° C. with the adsorbent while stirring the adsorbent by means of a magnetic stirrer. In this connection, the gaseous mixture is circulated through the eggplant type flask using a gas pump (B-106T type gas pump manufactured and sold by Iwaki K. K., Japan) during the initial 10 min. period of the contact of the gaseous mixture with the adsorbent. The amount of carbon monoxide adsorbed on the adsorbent is determined at 20° C. by the gas burette method. As a result, it is found that the amounts of carbon monoxide adsorbed on the adsorbent by the mutual contact for 3 min. and 60 min. are 5.5 mmol and 16.5 mmol, respectively and that, thereafter, there is caused little or no adsorption of ethylene on the adsorbent.

Then, the contents of the flask are heated at 80° C. and maintained at 80° C. to desorb the adsorbed carbon monoxide from the adsorbent. The amount of carbon monoxide desorbed is determined by the gas burette method. As a result, it is found that the amount of carbon monoxide desorbed reaches 11.5 mmol 30 min. after the initiation of the desorption operation. The gas desorbed from the adsorbent is determined by gas chromatography. As a result, it is found that the gas desorbed from the adsorbent is carbon monoxide only and contains no other gas.

Subsequently, substantially the same procedures as mentioned above are repeated to adsorb carbon monoxide on an adsorbent, except that the adsorbent from which the carbon monoxide has been desorbed above is used. The amount of carbon monoxide adsorbed on the adsorbent is determined in the same manner as mentioned above. As a result, it is found that the amounts of carbon monoxide adsorbed on the adsorbent by the mutual contact for 3 min. and 60 min. are 4.4 mmol and 11.5 mmol, respectively and that, thereafter, there is caused little or no adsorption of ethylene on the adsorbent. Then, the adsorbed carbon monoxide is desorbed from the adsorbent in the same manner as mentioned above. The amount of carbon monoxide desorbed is determined by the gas burette method. As a result, it is found that the amount of carbon monoxide desorbed reaches 11.5 mmol 30 min. after the initiation of the desorption operation and that, thereafter, there is caused little or no desorption of ethylene on the adsorbent.

In the same manner as mentioned above, the adsorption of carbon monoxide on the adsorbent and desorption of the adsorbed carbon monoxide are repeated 5 times. Despite the repeated use of the adsorbent there is observed little or no lowering in the adsorption rate of carbon monoxide and amount of carbon monoxide adsorbed on the adsorbent.

EXAMPLE 20

DIAION ®CR20 (a granular macroreticular polystyrene type resin having primary and secondary amino groups, manufactured and sold by Mitsubishi Chemical Industries, Ltd., Japan; effective diameter, 0.35–0.55 mm; water content, 55%; specific surface area, more than 30 m$^2$/g; content of the amino groups, 0.6 meq/g; color, a light yellow) is washed with ethanol and then dried at 80° C. for 12 hours in vacuo.

In an eggplant type flask having a capacity of 100 ml are charged in a dried nitrogen atmosphere 9.57 g (96.7 mmol) of copper(I) chloride which has been purified in Example 1, 10.0 g of DIAION ®CR20 which has been treated above and 100 ml of acetonitril as a solvent.

The contents of the eggplant type flask are stirred by means of a magnetic stirrer at 20° C. for 6 hours. Subsequently, the resulting mixture is subjected to removal of the solvent at 80° C. for 3 hours under a pressure of 6 mmHg. Thus, there is obtained 16.0 g of a granular adsorbent having a light green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 3.5 g, i.e. about 5.9 milliequivalents per milliequivalent of the amino groups contained in the macroreticular polystyrene type resin used.

In the same manner as mentioned above, an adsorbent of the present invention is 16.0 g of the above-prepared adsorbent is placed in an eggplant type flask having a capacity of 100 ml. The eggplant type flask is connected to a container containing 1.5 liters of a gaseous mixture of carbon monoxide and nitrogen (partial pressure: carbon monoxide, 0.9 atm; nitrogen, 0.1 atm), and the gaseous mixture is contacted with the adsorbent at 20° C. while stirring the adsorbent by means of a magnetic stirrer. In this connection, the gaseous mixture is circulated through the eggplant type flask using a gas pump (B-106T type gas pump manufactured and sold by Iwaki K. K., Japan) during the initial 10 min. period of the contact of the gaseous mixture with the adsorbent. The amount of carbon monoxide adsorbed on the adsorbent is determined at 20° C. by the gas burette method. As a result, it is found that the amounts of carbon monoxide adsorbed on the adsorbent by the mutual contact for 3 min. and 60 min. are 6.4 mmol and 9.2 mmol, respectively and that, thereafter, there is caused little or no adsorption of ethylene on the adsorbent.

Thereafter, the contents of the eggplant type flask are maintained at 20° C. for 10 min. under a pressure of 0.2 mmHg to desorb the adsorbed carbon monoxide from the adsorbent.

Subsequently, substantially the same procedures as mentioned above are repeated to adsorb carbon monoxide on an adsorbent, except that the adsorbent from which the carbon monoxide has been desorbed above is used. The amount of carbon monoxide adsorbed on the adsorbent is determined in the same manner as mentioned above. As a result, it is found that the amounts of carbon monoxide adsorbed on the adsorbent by the mutual contact for 3 min. and 60 min. are 5.8 mmol and 7.5 mmol, respectively and that, thereafter, there is caused little or no adsorption of ethylene on the adsorbent.

Thereafter, the contents of the eggplant type flask is maintained at 20° C. for 60 min. under a pressure of 0.2 mmHg to desorb the adsorbed carbon monoxide from the adsorbent.

Subsequently, substantially the same procedures as mentioned above are repeated to adsorb carbon monoxide on an adsorbent, except that the adsorbent from which the carbon monoxide has been desorbed above is used. The amount of carbon monoxide adsorbed on the adsorbent are determined in the same manner as mentioned above. As a result, it is found that the amount of carbon monoxide adsorbed on the adsorbent by the mutual contact for 60 min. is 7.5 mmol and that, thereafter, there is caused little or no adsorption of ethylene on the adsorbent.

In the same manner as mentioned above, the adsorption of carbon monoxide on the adsorbent and desorption of the adsorbed carbon monoxide are repeated 5 times. Despite the repeated use of the adsorbent there is observed little or no lowering in the adsorption rate of carbon monoxide and amount of carbon monoxide adsorbed on the adsorbent.

EXAMPLE 21

In an eggplant type flask having a capacity of 100 ml are charged in a dried nitrogen atmosphere 9.9 g (100 mmol) of copper(I) chloride which has been purified in Example 1, 9.9 g of AMBERLITE ®IRA-94 which has been treated in Example 9, and 100 ml of acetonitrile as a solvent.

The contents of flask are stirred by means of a magnetic stirrer at 20° C. for 6 hours. Subsequently, the resulting mixture is subjected to removal of the solvent at 80° C. for 4 hours under a pressure of 6 mmHg. Thus, there is obtained a granular adsorbent having a light green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 5.0 g, i.e. about 0.7 milliequivalent per milliequivalent of the tertiary groups contained in the macroreticular polystyrene type resin (AMBERLITE ®IRA-94) used.

In the same manner as mentioned above, an adsorbent of the present invention is produceded. 14.9 g of the above-obtained adsorbent is placed in an eggplant type flask having a capacity of 100 ml. The eggplant type flask is connected to a container containing 1.5 liters of a gaseous mixture of carbon monoxide and nitrogen (partial pressure: carbon monoxide, 0.9 atm; nitrogen, 0.1 atm). The gaseous mixture in the container is contacted at 20° C. with the adsorbent while stirring the adsorbent with a magnetic stirrer. In this connection, the gaseous mixture is circulated through the eggplant type flask using a gas pump (B-106T type gas pump manufactured and sold by Iwaki K. K., Japan) during the initial 10 min. period of the contact of the gaseous mixture with the adsorbent. The amount of carbon monoxide adsorbed on the adsorbent is determined at 20° C. by the gas burette method. As a result, it is found that the amounts of carbon monoxide adsorbed on the adsorbent by the mutual for 3 min. and 60 min. are 6.7 mmol and 9.5 mmol, respectively and that, thereafter, there is caused little or no adsorption of ethylene on the adsorbent.

Thereafter, the contents of the eggplant type flask are maintained at 20° C. for 10 min. under a pressure of 0.2 mmHg to desorb the adsorbed carbon monoxide from the adsorbent.

Subsequently, substantially the same procedures as mentioned above are repeated to adsorb carbon monoxide on an adsorbent, except that the adsorbent from which the carbon monoxide has been desorbed above is used. The amount of carbon monoxide adsorbed on the adsorbent is determined in the same manner as mentioned above. As a result, it is found that the amounts of carbon monoxide adsorbed on the adsorbent by the mutual contact for 3 min. and 60 min. are 6.4 mmol and 8.9 mmol, respectively and that, thereafter, there is caused little or no adsorption of ethylene on the adsorbent.

Thereafter, the contents of the eggplant type flask are maintained at 20° C. for 60 min. under a pressure of 0.2 mmHg to desorb the adsorbed carbon monoxide from the adsorbent.

Subsequently, substantially the same procedures as mentioned above are repeated to adsorb carbon monoxide on an adsorbent, except that the adsorbent from which the carbon monoxide has been desorbed just above is used. The amount of carbon monoxide adsorbed on the adsorbent is determined in the same manner as mentioned above. As a result, it is found that the amount of carbon monoxide adsorbed on the adsorbent by the mutual contact for 60 min. is 8.9 mmol and that, thereafter, there is caused little or no adsorption of ethylene on the adsorbent.

In the same manner as mentioned above, the adsorption of carbon monoxide on the adsorbent and desorption of the adsorbed carbon monoxide are repeated 5 times. Despite the repeated use of the adsorbent there is observed little or no lowering in the adsorption rate of carbon monoxide and amount of carbon monoxide adsorbed on the adsorbent.

EXAMPLE 22

In an eggplant type flask having a capacity of 100 ml are charged in a dried nitrogen atmosphere 7.17 g (50 mmol) of copper(I) bromide (a special grade reagent, manufactured and sold by Yoneyama Yakuhin Kogyo Co., Ltd., Japan), 5.0 g of DIAION ®WA20 which has been treated in Example 1, and 100 ml of a mixture of water and acetonitrile (water/acetonitrile volume ratio =1:1) as a solvent.

The contents of the flask are stirred by means of a magnetic stirrer at 20° C. for 6 hours. Subsequently, the resulting mixture is subjected to removal of the solvent at 80° C. for 5 hours under a pressure of 6 mmHg. Thus, there is obtained 10.1 g of a granular adsorbent having a light green color.

The above-obtained adsorbent is analyzed by X-ray photoelectron spectroscopy in substantially the same manner as in Example 1. As a result, it is confirmed that copper(I) is present but copper(II) is absent in the adsorbent.

In the same manner as in Example 18, an adsorbent of the present invention is produced. 10.1 g of the above-obtained adsorbent is charged in an eggplant type flask having a capacity of 100 ml. The eggplant type flask is connected to a container containing 1.5 liters of a gaseous mixture of carbon monoxide and nitrogen (partial pressure: carbon monoxide, 0.9 atm; nitrogen, 0.1 atm). The gaseous mixture in the container is contacted at 20° C. with the adsorbent while stirring the adsorbent by means of a magnetic stirrer. In this connection, the gaseous mixture is circulated through the eggplant type flask using a gas pump (B-106T type gas pump manufactured and sold by Iwaki K. K., Japan) during the initial 10 min. period of the contact of the gaseous mixture with the adsorbent. The amount of carbon monoxide adsorbed on the adsorbent is determined at 20° C. by the gas burette method. As a result, it is found that the amounts of carbon monoxide adsorbed on the adsorbent by the mutual contact for 3 min. and 60 min. are 2.6 mmol and 6.4 mmol, respectively and that, thereafter, there is caused little or no adsorption of ethylene on the adsorbent.

Thereafter, the contents of the eggplant type flask are maintained at 20° C. for 60 min. under a pressure of 0.2 mmHg to desorb the adsorbed carbon monoxide from the adsorbent.

Subsequently, substantially the same procedures as mentioned above are repeated to adsorb carbon monoxide on an adsorbent, except that the adsorbent from which the adsorbed carbon monoxide has been desorbed above is used. The amount of carbon monoxide adsorbed on the adsorbent is determined in the same manner as mentioned above. As a result, it is found that the amounts of carbon monoxide adsorbed on the adsorbent by the mutual contact for 3 min. and 60 min. are 1.1 mmol and 2.1 mmol, respectively and that, thereafter, there is caused little or no adsorption of ethylene on the adsorbent.

Thereafter, the contents of the eggplant type flask are maintained at 20° C. for 60 min. under a pressure of 0.2 mmHg to desorb the adsorbed carbon monoxide from the adsorbent.

Subsequently, substantially the same procedures as mentioned above are repeated to adsorb carbon monoxide on an adsorbent, except that the adsorbent from which the carbon monoxide has been desorbed above is used. The amount of carbon monoxide adsorbed on the adsorbent is determined in the same manner as mentioned above. As a result, it is found that the amount of carbon monoxide adsorbed on the adsorbent by the mutual contact for 60 min. is 2.1 mmol and that, thereafter, there is caused little or no adsorption of ethylene on the adsorbent.

In the same manner as mentioned above, the adsorption of carbon monoxide on the adsorbent and desorption of the adsorbed carbon monoxide are repeated 5 times. Despite the repeated use of the adsorbent there is caused little or no lowering in the adsorption rate of carbon monoxide and amount of carbon monoxide adsorbed on the adsorbent.

EXAMPLE 23

In an eggplant type flask having a capacity of 100 ml are charged in a dried nitrogen atmosphere 4.95 g (50 mmol) of copper(I) chloride which has been purified in Example 1, 5.0 g of DIAION ®WA20 which has been treated in Example 1 and 100 ml of ethanol (special grade reagent, manufactured and sold by Kanso Kagaku Sangyo K. K., Japan) as a solvent.

The contents of the eggplant type flask are stirred by means of a magnetic stirrer at 20° C. for 6 hours. Subsequently, the resulting mixture is subjected to removal of the solvent at 80° C. for 4 hours under a pressure of 6 mmHg. Thus, there is obtained 8.4 g of a granular adsorbent having a light green color.

The above-obtained adsorbent is analyzed by X-ray photoelectron spectroscopy in substantially the same manner as in Example 1. As a result, it is confirmed that copper(I) is present but copper(II) is absent in the adsorbent.

In the same manner as mentioned above, an adsorbent of the present invention is produced. 8.4 g of the above-prepared adsorbent is charged in an eggplant type flask. The eggplant type flask is connected to a container containing 1.5 liters of a gaseous mixture of carbon monoxide and nitrogen (partial pressure: carbon monoxide, 0.9 atm; nitrogen, 0.1 atm), and the gaseous mixture in the container is contacted with the adsorbent at 20° C. while stirring the adsorbent by means of a magnetic stirrer. Incidentally, the gaseous mixture is circulated through the flask using a gas pump (B-106T type gas pump manufactured and sold by Iwaki K. K., Japan) during the initial 10 min. period of the contact of the gaseous mixture with the adsorbent. The amount of carbon monoxide adsorbed on the adsorbent is determined by the gas burette method. As a result, it is found that the amounts of carbon monoxide adsorbed on the adsorbent by the mutual contact for 3 min. and 60 min. are 1.5 mmol and 3.0 mmol, respectively and that, thereafter, there is caused little or no adsorption of ethylene on the adsorbent.

EXAMPLE 24

In an eggplant type flask having a capacity of 100 ml are placed in a dried nitrogen atmosphere 4.95 g (50 mmol) of copper(I) chloride which has been purified in Example 1, 5.0 g of DIAION ®WA20 which has been treated in Example 1 and 100 ml of benzonitrile (a special grade reagent, manufactured and sold by Nakarai Kagaku Yakuhin K. K., Japan) as a solvent.

The contents of the eggplant type flask are stirred by means of a magnetic stirrer at 20° C. for 6 hours. Subsequently, the resulting mixture is subjected to removal of the solvent at 80° C. for 3 hours under a pressure of 6 mmHg. Thus, there is obtained 8.2 g of a granular adsorbent having a light green color.

The above-obtained adsorbent is analyzed by X-ray photoelectron spectroscopy in substantially the same manner as in Example 1. As a result, it is confirmed that copper(I) is present but copper(II) is absent in the adsorbent.

In the same manner as mentioned above, an adsorbent of the present invention is produced. 8.2 g of the above-prepared adsorbent is placed in an eggplant type flask having a capacity of 100 ml. The eggplant type flask is connected to a container containing 1.5 liters of a gaseous mixture of carbon monoxide and nitrogen (partial pressure: carbon monoxide, 0.9 atm; nitrogen, 0.1 atm), and the gaseous mixture is contacted with the adsorbent at 20° C. while stirring the adsorbent by means of a magnetic stirrer. In this connection, the gaseous mixture is circulated through the flask using a gas pump (B-106T type gas pump manufactured and sold by Iwaki K. K., Japan) during the initial 10 min. period of the contact of the gaseous mixture with the adsorbent. The amount of carbon monoxide adsorbed on the adsorbent is determined at 20° C. by the gas burette method. As a result, it is found that the amounts of carbon monoxide adsorbed on the adsorbent by the mutual contact for 3 min. and 60 min. are 2.4 mmol and 7.6 mmol, respectively and that, thereafter, there is caused little or no adsorption of ethylene on the adsorbent.

EXAMPLE 25

In an eggplant type flask having a capacity of 100 ml are charged in a dried nitrogen atmosphere 1.49 g (15 mmol) of copper(I) chloride which has been purified in Example 1, 5.0 g of DIAION ®WA20 which has been treated in Example 1 and 30 ml of water as a solvent.

The contents of flask are stirred by means of a magnetic stirrer at 20° C. for 6 hours. Subsequently, the resulting mixture is subjected to removal of the solvent at 80° C. for 4 hours under a pressure of 6 mmHg. Thus, there is obtained 6.0 g of a granular adsorbent having a light green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 1.0 g, i.e. about 0.5 milliequivalent per milliequivalent of the amino groups contained in the macroreticular polystyrene type resin used.

In the same manner as mentioned above, an adsorbent of the present invention is produced. 6.0 g of the above-prepared adsorbent is charged in an eggplant type flask having a capacity of 100 ml. The eggplant type flask is connected to a container containing 1.5 liters of a gaseous mixture of carbon monoxide and nitrogen (partial pressure carbon monoxide, 0.9 atm; nitrogen, 0.1 atm), and the gaseous mixture in the container is contacted with the adsorbent at 20° C. while stirring the adsorbent by means of a magnetic stirrer. In this connection, the gaseous mixture is circulated through the flask using a gas pump (B-106T type gas pump manufactured and sold by Iwaki K. K., Japan) during the initial 10 min. period of the contact of the gaseous mixture with the adsorbent. The amount of carbon monoxide adsorbed on the adsorbent is determined at 20° C. by the gas burette method. As a result, it is found that the amounts of carbon monoxide adsorbed on the adsorbent by the mutual contact for 3 min. and 60 min. are 4.1 mmol and 5.1 mmol, respectively and that, thereafter, there is caused little or no adsorption of ethylene on the adsorbent.

EXAMPLE 26

In an eggplant type flask having a capacity of 100 ml are charged in a dried nitrogen atmosphere 1.49 g (15 mmol) of copper(I) chloride which has been purified in Example 1, 20.0 g of DIAION ®WA20 which has been treated in Example 1 and 30 ml of 0.5 N HCl as a solvent.

The contents of flask are stirred by means of a magnetic stirrer at 20° C. for 6 hours. Subsequently, the resulting mixture is subjected to removal of the solvent at 80° C. for 4 hours under a pressure of 6 mmHg. Thus, there is obtained 21.4 g of a granular adsorbent having a light green color.

The above-obtained adsorbent is analyzed by X-ray photoelectron spectroscopy in substantially the same manner as in Example 1. As a result, it is confirmed that copper(I) is present but copper(II) is absent in the adsorbent.

Then, the amount of copper(I) chloride contained in the adsorbent is determined in substantially the same manner as in Example 1, and found to be 1.4 g, i.e. about 0.2 milliequivalent per milliequivalent of the amino groups contained in the macroreticular polystyrene type resin used.

In the same manner as mentioned above, an adsorbent of the present invention is produced. 21.4 g of the above-prepared adsorbent is charged in an eggplant type flask having a capacity of 100 ml. The eggplant type flask is connected to a container containing 1.5 liters of a gaseous mixture of carbon monoxide and nitrogen (partial pressure: carbon monoxide, 0.9 atm; nitrogen, 0.1 atm), and the gaseous mixture in the container is contacted with the adsorbent at 20° C. while stirring the adsorbent by means of a magnetic stirrer. In this connection, the gaseous mixture is circulated through the eggplant type flask using a gas pump (B-106T type gas pump manufactured and sold by Iwaki K. K., Japan) during the initial 10 min. period of the contact of the gaseous mixture with the adsorbent. The amount of carbon monoxide adsorbed on the adsorbent is determined at 20° C. by the gas burette method. As a result, it is found that the amounts of carbon monoxide adsorbed on the adsorbent by the mutual contact for 3 min. and 60 min. are 4.4 mmol and 6.0 mmol, respectively and that, thereafter, there is caused little or no adsorption of ethylene on the adsorbent.

EXAMPLE 27

In the same manner as in Example 14, an adsorbent of the present invention is 17.2 g of the above-prepared adsorbent is charged in an eggplant type flask having a capacity of 100 ml. The eggplant type flask is connected to a container containing 796 ml of a gaseous mixture of carbon monoxide and carbon dioxide (pressure, 1 atm; carbon monoxide/ carbon dioxide volume ratio, =1:1), and the gaseous mixture in the container is contacted at 20° C. with the adsorbent. The amount of the gaseous mixture adsorbed on the adsorbent is determined by the gas burette method. As a result, it is found that 298 ml of the gaseous mixture is adsorbed on the adsorbent by the mutual contact for 2 hours and that, thereafter, there is caused little or no adsorption of the gaseous mixture on the adsorbent. The residual gas is analyzed by using 701-type Gas Chromatograph (a gas chromatograph manufactured and sold by Ohkura Rikagaku Kenkyusho Co., Ltd., Japan; packing material, Porapak Q manufactured and sold by Gasukuro Kogyo Inc., Japan; column temperature, 110° C.; carrier gas, helium). As a result, it is found that the carbon monoxide/carbon dioxide molar ratio in the residual gas is 0.5:1, and that, therefore, the amount of carbon dioxide adsorbed on the adsorbent is 66 ml while the amount of carbon monoxide adsorbed on the adsorbent is 232 ml, i.e. 3.5 times, by volume, the amount of carbon dioxide adsorbed on the adsorbent.

EXAMPLES 28 to 30

Three kinds of adsorbents which are different from each other in the amount of copper(I) chloride fixed to the macroreticular polystyrene type resin are prepared in substantially the same manner as in Example 1, except that the amount of copper(I) chloride used is changed as shown in Table 2 given below.

With respect to the above-obtained adsorbents, tests on the adsorption of carbon monoxide and carbon dioxide are effected to determine the equilibrium adsorption amount of each gas in substantially the same manner as in Example 18, except that the aboveobtained adsorbents are used instead of the adsorbent used in Example 18. The results obtained are shown in Table 2 given below.

TABLE 2

| Ex. No. | Cu(I) chloride Amount used (g) | Macroreticular polystyrene type resin Amount used (g) | Amount of Cu(I) chloride adsorbed on the resin (meq of Cu(I) chloride per meq of the amino groups contained in the resin) | Equilibrium adsorption amount of gas | | [A]/[B] |
|---|---|---|---|---|---|---|
| | | | | carbon monoxide (mmol) [A] | carbon dioxide (mmol) [B] | |
| 28 | 4.0 | 10 | 1.0 | 11.2* | 3.2* | 3.5 |
| 29 | 6.5 | " | 1.5 | 13.7* | 2.7* | 5.1 |
| 30 | 10 | " | 1.8 | 16.5* | 2.6* | 6.4 |

Note:
*The adsorptions of carbon monoxide and carbon dioxide reaches equilibrium about 60 min after the initiation of the contact of the gas with the adsorbent.

What is claimed is:

1. An adsorbent for use in the selective adsorption-separation of a gas from a gaseous mixture, which comprises a macroreticular polystyrene resin having amino groups selected from the group consisting of primary, secondary and tertiary amino groups and combinations thereof, and a copper(I) halide fixed to said macroreticular polystyrene resin in an amount of at least 1.0 milliequivalents per milliequivalent of the amino groups contained in said macroreticular polystryene resin, said adsorbent being prepared by mixing said macroreticular polystyrene resin and a copper(I) halide in a solvent, and removing said solvent.

2. An absorbent according to claim 1, wherein said macroreticular polystyrene resin comprises a crosslinked copolymer of substituted or unsubstituted styrene monomer units and divinyl aromatic compound monomer units, and said amino groups bonded to said crosslinked copolymer.

3. An adsorbent according to claim 2, wherein said substituted or unsubstituted styrene is a member selected from the group consisting of styrene, α-methylstyrene, p-methylstyrene and p-tert-butylstyrene.

4. An adsorbent according to claim 2, wherein said divinyl aromatic compound is a member selected from the group consisting of divinylbenzenes, divinyltoluenes and divinylethylbenzenes.

5. An adsorbent according to claim 1, wherein said macroreticular polystyrene resin has a specific surface area of 1 to 1,000 $m^2/g$ as measured according to the BET method using nitrogen.

6. An adsorbent according to claim 1, wherein said copper(I) halide is fixed to said macroreticular polystyrene resin in an amount of at least 1.5 milliequivalents per milliequivalent of the amino groups contained in said macroreticular polystyrene type resin.

7. A process for producing an adsorbent for use in the selective adsorption and separation of a gas from a gaseous mixture, which comprises mixing a macroreticular polystryene resin having amino groups selected from the group consisting of primary, secondary and tertiary amino groups and combinatioins thereof and a copper (I) halide in a solvent, said copper(I) halide being employed in an amount of at least 1.0 milliequivalents per milliequivalent of the amino groups contained in said macroreticular polystyrene resin, and removing said solvent.

8. A process according to claim 7, wherein said solvent is a member selected from the group consisting of water, an aqueous hydrochloric acid, an aqueous ammonia, an alcohol having 1 to 6 carbon atoms, an α-olefin having 4 to 8 carbon atoms, a hydrocarbon cyanide having 2 to 8 carbon atoms, and a mixture of water and a hydrocarbon cyanide having 2 to 8 carbon atoms.

* * * * *

UNITED STATES PATENT AND TRADEMARK OFFICE
CERTIFICATE OF CORRECTION

PATENT NO. : 4,675,309
DATED : June 23, 1987
INVENTOR(S) : HIRAI et al

It is certified that error appears in the above-identified patent and that said Letters Patent is hereby corrected as shown below:

Column 32, line 4, "absorbent" should read --adsorbent--;
line 47, "milliequivalents" should read --milliequivalent--.

Signed and Sealed this

Eighth Day of March, 1988

Attest:

DONALD J. QUIGG

*Attesting Officer*  *Commissioner of Patents and Trademarks*